UNITED STATES PATENT OFFICE.

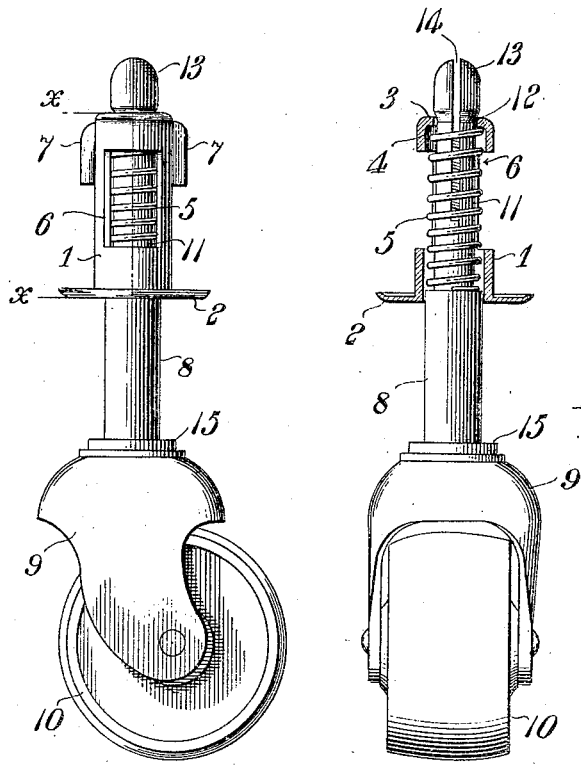

EDWIN HALL HUMPHREY, OF BATTLE CREEK, MICHIGAN, ASSIGNOR OF ONE-THIRD TO CHARLES C. BLAKELY AND ONE-THIRD TO DANIEL W. CONNORS, OF ALBION, MICHIGAN, AND ONE-TWELFTH TO SIMON H. BODENHEIM AND ONE-TWELFTH TO GABRIEL S. BODENHEIM, OF NEW YORK, N. Y.

CASTER.

No. 898,740.      Specification of Letters Patent.      Patented Sept. 15, 1908.

Application filed January 29, 1907. Serial No. 354,772.

*To all whom it may concern:*

Be it known that I, EDWIN H. HUMPHREY, a citizen of the United States, residing at Battle Creek, in the county of Calhoun and State of Michigan, have invented a new and useful Caster, of which the following is a specification.

This invention relates to furniture casters and its object is to provide a device of this character having a socket of novel form adapted to be driven into the furniture and to be retained securely in position therein by the contraction of the wood into engagement with the socket.

A still further object is to provide a stem having a contractible end adapted to be forced through the socket so as to prevent the accidental withdrawal of the stem but which will contract and allow the stem to be withdrawn when sufficient pressure is exerted thereon.

A still further object is to provide cushioning means whereby the stem is held normally projected beyond one end of the socket but will move thereinto and against the tension of the cushioning means when downward pressure is exerted upon the socket, as when a person sits upon a chair to which the caster is attached.

A still further object is to provide means whereby friction between the stem and the socket is reduced to the minimum when the cushioning means is under tension thereby permitting the stem of the caster to freely rotate within the socket.

With these and other objects in view the invention consists of certain novel features of construction and combinations of parts which will be hereinafter more fully described and pointed out in the claims.

In the accompanying drawings is shown the preferred form of the invention.

In said drawings: Figure 1 is a side elevation of the caster; and Fig. 2 is a similar view looking from the right of Fig. 1, the socket member being shown in section on line *x—x*, Fig. 1.

Referring to the figures by characters of reference, 1 is a cylindrical sleeve constituting the socket of the caster and provided at one end with an annular flange 2 while its other end has an inwardly extending flange 3 the inner face of which is flat as shown at 4 and constitutes a seat for one end of a coiled spring 5 constituting a cushion. Opposite portions of the sleeve are cut away to form rectangular openings 6 and arranged between these openings and adjacent one end of the sleeve are angular wings 7 which extend longitudinally of the sleeve for a portion of the length thereof.

Slidably and rotatably mounted within that end of sleeve 1 surronded by flange 2 is a spindle 8 having a yoke 9 at its outer end in which is mounted the caster roller 10. A stem 11 extends from the inner end of the spindle and the diameter of this stem is slightly less than the inner opening 12 which is surrounded by a flange 3. A substantially oval head 13 is formed at the free end of stem 11 and the greatest transverse diameter of this head is slightly larger than the diameter of the opening 12. This head 13 is divided longitudinally by a slot 14 extending into the stem 11 whereby the head 13 can be contracted sufficiently to permit it to pass through the opening 12. The spring 5 surrounds the stem 11 and bears at one end against the spindle 8 so that the yoke 9 is normally pressed away from sleeve 1 and the head 13 is held normally in contact with said sleeve. The pressure exerted by the spring is not sufficient however to cause the head 13 to contract and pass through the opening 12. A collar 15 surrounds the spindle 8 close to the yoke 9 and constitutes an end bearing for the sleeve 1 when sufficient pressure is exerted longitudinally upon said sleeve to overcome the stress of the spring.

If the caster is to be attached to the leg of a chair a recess is first formed within the chair leg in the usual manner after which the sleeve 1 is driven thereinto until stopped by the flange 2. Any expansion of the wood which may occur will result in the contraction of the wall of the recess about the sleeve 1 and portions of said wall will be projected into the openings 6 and thereby permanently fasten the sleeve and prevent it from being withdrawn. The wings or ribs 7 will obviously prevent any tendency of the sleeve to rotate.

It will be observed by reference to Fig. 1 that the wings extend only about one-third of the length of the sleeve. The object of this arrangement is to render the union between the sleeve and the furniture leg of a more stable character than would result if the wings extended throughout the length of the sleeve. This is due to the fact that when the sleeve is seated the walls of the grooves formed by the wings and below the same, will be free to close or contract and thus operate to anchor the sleeve in place, whereas if the wings extended throughout the entire length of the sleeve this important function would be destroyed.

After the sleeve has been placed in position the spring 5 is placed upon the stem 11 and the head 13 is inserted into the sleeve and against the flange 3. By pushing inward with increased pressure this head will be contracted and will slip through the opening 12 after which it will expand and thereby hold the parts assembled. The spring 5 exerts a constant longitudinal pressure upon the spindle 8 and when the sleeve is subjected to downward pressure, as when a person sits upon the chair, this spring becomes compressed between spindle 8 and flange 3 and will promptly return the spindle to its normal position when said pressure is removed. By pulling outward on the spindle 8 with sufficient pressure the head 13 can be caused to contract so as to slip through the opening 12.

A special feature of importance in connection with the head is that the cleft is disposed at right angles to the roller axle. This arrangement is adopted in order to overcome any tendency on the part of the head or spindle to rock upon and thus wear away the wall of the opening in the flange 3, with the result that the head would in time be free to detach itself from the sleeve. It will be obvious by reference to Fig. 2, that if the cleft were disposed in parallelism with the roller axle, the strains applied to the axle in the use of a chair equipped with this caster would cause the members of the head to close and thus reduce the transverse diameter of the head with the result that the members would rock or ride upon the walls of the flange opening. This movement while slight would in time wear away the walls and by thus enlarging the opening permit the spindle to work loose. By disposing the cleft at right angles to the roller axle, any strain that would tend to cause the spindle to tilt will bring an unyielding surface of the head to bear against the walls of the flange opening, thus in a positive manner operating to obviate the objectionable feature above noted.

By constructing the caster in the manner herein described it becomes possible to very readily remove a spindle having a broken roller and to replace it with a new one. Moreover, the action of the cushioning spring will add considerably to the comfort of the chair. Although the caster is particularly designed for use upon chairs and the like it is to be understood that the same can be employed with advantage on any article of furniture requiring the use of casters.

What is claimed is:

A caster comprising a one-piece spindle carrying at one end portion a roller and having its other end portion circumferentially reduced and provided with a head and cleft at right angles to the roller axle through a part of the length of the reduced portion, a coiled spring mounted upon the said reduced portion and bearing at one end on the shoulder produced by the reduction, and a loose sleeve having one end surrounding the spindle below the shoulder and provided with an outward extending flange, and its other end provided with laterally projecting wings and with an inward extending flange that is engaged by the other end of the spring.

In testimony that I claim the foregoing as my own, I have hereto affixed my signature in the presence of two witnesses.

EDWIN HALL HUMPHREY.

Witnesses:
H. C. ROSSER,
I. W. SCHRAM.